(12) United States Patent
Dobbs et al.

(10) Patent No.: US 6,549,001 B1
(45) Date of Patent: Apr. 15, 2003

(54) UNITIZED TONE RING ASSEMBLY

(75) Inventors: David Dobbs, Livonia, MI (US); Mark F. Spreitzer, Milford, MI (US); Morgan J. Bullard, Hampshire, IL (US)

(73) Assignee: SKF USA Inc., Elgin, IL (US)

( * ) Notice: Subject to any disclaimer, the term of this patent is extended or adjusted under 35 U.S.C. 154(b) by 20 days.

(21) Appl. No.: 10/012,880

(22) Filed: Nov. 2, 2001

(51) Int. Cl.$^7$ .............................. G01P 3/48; G01B 7/30
(52) U.S. Cl. ................. 324/173; 324/207.22; 384/448
(58) Field of Search ................................ 324/166, 173, 324/174, 207.22, 207.25; 384/448; 277/372, 373

(56) References Cited

U.S. PATENT DOCUMENTS

| | | | | |
|---|---|---|---|---|
| 4,940,936 A | * | 7/1990 | Grillo et al. ................. 324/174 |
| 5,004,358 A | * | 4/1991 | Varvello et al. ............ 384/446 |
| 5,166,611 A | * | 11/1992 | Kujawa et al. ............. 324/166 |
| 5,491,407 A | * | 2/1996 | Maxson et al. ............. 324/174 |
| 5,570,013 A | * | 10/1996 | Polinsky et al. ............ 324/174 |
| 5,739,684 A | * | 4/1998 | Burns ......................... 324/173 |
| 5,814,984 A | * | 9/1998 | Ohmi et al. ................. 324/173 |
| 5,825,176 A | * | 10/1998 | Babin et al. ................ 324/174 |
| 5,850,141 A | * | 12/1998 | Adler .......................... 324/174 |
| 5,997,182 A | * | 12/1999 | Brown ......................... 384/448 |
| 6,155,573 A | * | 12/2000 | Simms ......................... 277/373 |

FOREIGN PATENT DOCUMENTS

| | | | | |
|---|---|---|---|---|
| EP | | 875700 A2 | * 11/1998 | ............ F16J/15/32 |
| WO | WO 9966222 A1 | * 12/1999 | ............ F16C/33/66 |

* cited by examiner

Primary Examiner—Edward Lefkowitz
Assistant Examiner—Darrell Kinder
(74) Attorney, Agent, or Firm—Vedder Price Kaufman & Kammholz

(57) ABSTRACT

A tone ring assembly for use on a rotatable machine part. The tone ring is able to generate a varying voltage output when rotated at varying speeds. A fixed position magnetic sensor detects this voltage. The tone ring comprises an axially extending main body portion having a plurality of areas able to generate a voltage upon rotation. A retainer having at least one radial flange prevents axial movement of the tone ring and the tone ring includes ribs and spaces on its inside diameter to permit oil to pass therethrough.

40 Claims, 4 Drawing Sheets

UNITIZED TONE RING ASSEMBLY

BACKGROUND OF THE INVENTION

The present invention relates to an assembly including a so-called tone ring or exciter ring and a magnetic sensor unit. More particularly, the present invention relates to a portion of a vehicle or other mechanical assembly which is adapted to create a signal of varying voltage output when rotated at varying speeds, with such signal being detected by a pickup or sensor unit with which the rotary part is associated.

The tone ring preferably has a large plurality of teeth, vanes or lands separated by spaces or grooves therein or can also be a simple cylinder with strips of magnetic rubber molded into it or otherwise fastened to it. Passing the lands or magnets by a fixed sensor at varying speeds creates a speed-varying signal in the sensor and gives an indication of the rotational speed of the shaft with which the tone ring is associated.

The assembly is primarily intended for vehicles wherein the rotational shaft speed, and particularly variations in the rotational speed of two or more shafts, is sensed for various purposes. These include use in ABS (anti-lock braking systems), differential actuation or control, traction control, all-wheel drive control, vehicle stability and the like. In addition, the invention can be used in other applications, such as sensing the rotational speed of power take-off shafts or other power transmission devices including one or more rotary shafts.

In the past, tone rings have been fitted onto axle shafts or other rotating members by press fitting them into place like a bearing or seal. This method can be cumbersome at best, and impossible at worst. Other methods of incorporating tone rings on rotary mechanisms involved integrating the tone rings with bearings or with the hubs or with the ring gear, with the tone ring being associated with the rotary part. Because the shaft undergoes deflection in use, and for other reasons, these methods are sometimes not satisfactory, especially where the bearing/sensor system is too rigid to accommodate such shaft deflection in use.

Other tone rings or proposals for tone rings involve installing forces that might easily damage the tone ring or sensor. Still others would lack a unitizing feature, wherein means are provided to prevent axial movement of the tone ring beyond certain limits, or where installing a retainer determines the position of the tone ring, at least approximately.

If a tone ring assembly could be provided which was unitized, as a system approach, it would result in simplified assembly. Likewise, if a tone ring could be made that had mating components installable with low force, especially a construction in which, after installation, the tone ring would grip the shaft more tightly than during initial installation, it would be highly desirable.

Particularly, if a tone ring assembly were provided which would be associated with a part of the shaft which underwent little or no deflection in use, it would be greatly advantageous. Were these advantages attainable in a design which provided at least one, and preferably several, axial oil passages in use, it would be very desirable.

It would also be desirable to provide a unitizing retainer in the form of a sleeve with radially inner and outer portions to engage and package a radial flange of the tone ring, or the entire tone ring itself and allow only a limited range of axial movement between flanges of the retainer and tone ring or limited movement of the entire tone ring. Also, this unitizing retainer could be made of one piece in stamped steel or formed in a tough plastic such as Delrin.

Accordingly, it is an object of the present invention to provide an improved tone ring element able to generate a voltage output by rotation, preferably either in the form of a sleeve having multiple lands, grooves, teeth or magnets for signaling an associated magnetic sensor or pickup as the tone ring lands or magnets rotate past the sensor. By "tone ring" or like words is meant not only a single ring element, but also a plurality of rings, working in concert with sensors connected to or associated with a rotational speed differential computer and feedback mechanism.

Another object of the invention is to provide a tone ring assembly which is separate from the bearing or seal assembly yet which is associated with an axle shaft supported on such bearings.

Yet another object of the invention is to provide a tone ring assembly which is sufficiently flexible and positioned such that it is able to accommodate limited axle shaft deflections in use, and also accommodate a limited amount of end play in such shafts.

Still another object of the invention is to provide a tone ring and retainer which can initially be installed by an ergonomically acceptable force by placing it with an installation tool in place within the axle tube or housing and then sliding the axle shaft through the tone ring with ergonomically desirable forces and just past its functional position in the application to permit an axially inner axle shaft retainer or "C" clip to be installed in a groove in the axle shaft. Thereafter, when the axle shaft is moved just slightly axially outwardly, the clip and the tone ring are centered or aligned axially in place.

A further object of the invention is to provide a design of tone ring and retainer which can be positioned so as to be in an area of the shaft which undergoes minimum deflection in use.

A still further object of the invention is to provide a design which is unitized for simple and relatively foolproof assembly.

An additional object of the invention is to provide a tone ring which, while installing easily, will thereafter use the swell of rubber in reaction to assembly and/or subsequent application lubricant to develop a more firm grip on the shaft.

Another object of the invention is to provide a design which is compatible with the axle configuration so that there is sufficient axial travel of the axle shaft to enable a retainer or "C" clip to be dropped in place over the axially inner end of the axle shaft, and thereafter, enable the axle shaft to be pulled out a few millimeters to seat the clip, thus loading a thermoplastic or thermoset spacer as the tone ring slides slightly out to a "home" position on the shaft. This spacer can be eliminated if more axial width for retainers is available. It can also be eliminated if the retainer or toner ring flange is made of thermoset or thermoplastic material.

Yet another object of the invention is to provide a tone ring which lies axially inside the seal and bearing, but is held in position axially by engagement between the opposed flanges of the retainer and the flange of the powdered metal sleeve. It is initially held radially by inner diameter ribs on the tone ring, and thereafter held more firmly in place by lubricant swelling of these radial ribs. The powdered metal flange may be eliminated or the powdered metal tone ring/flange combination may become two or more pieces assembled or molded as an alternate design.

Still another object of the invention is to provide substantial axial width of the tone ring teeth so the location of the sensor relative to the tone ring accommodates any variation in the stack-up or end play tolerances in the application.

Another object of the invention is to provide a tone ring that will fit over the smallest machined diameter of an axle shaft, leaving larger respective diameters for accommodating the bearings and the oil seal, respectively and allowing the components to be assembled inside the axle tube.

A further object of the invention is to provide a tone ring assembly which inherently allows a desired or correct assembly sequence with the axle shaft, the seal, the bearing and the tone ring. The tone ring assembly can also be reused after disassembly in the field.

A still further object of the invention is to provide a grooved or corrugated outside diameter on the retainer to provide desired passages for oil between the axle tube housing and that of the retainer.

An additional object of the invention is to provide a tone ring assembly which will allow passage of oil along one, two or several paths through the tone ring and/or around the tone ring.

The invention achieves these objects and others which are inherent therein by providing an assembly which includes a rotatable tone or exciter ring able to generate a varying voltage output by rotation relative to a magnetic sensor, and ribs on its inner diameter, which includes an optional radial flange, optionally an abutting spacer with radial oil passage spaces, a retainer having at least one radial flange, one or more oil passage features, with the associated sensor being adapted to pick up a speed varying signal as the lands or magnets on the tone ring sleeve pass by the sensor.

The manner in which these and other objects of the invention are achieved in practice will become more clearly apparent when reference is made to the following detailed description of the preferred embodiments of the present invention set forth by way of example and shown in the accompanying drawings, in which like reference numerals indicate corresponding parts throughout.

DETAILED DESCRIPTION OF THE PREFERRED EMBODIMENTS

Figure 1:
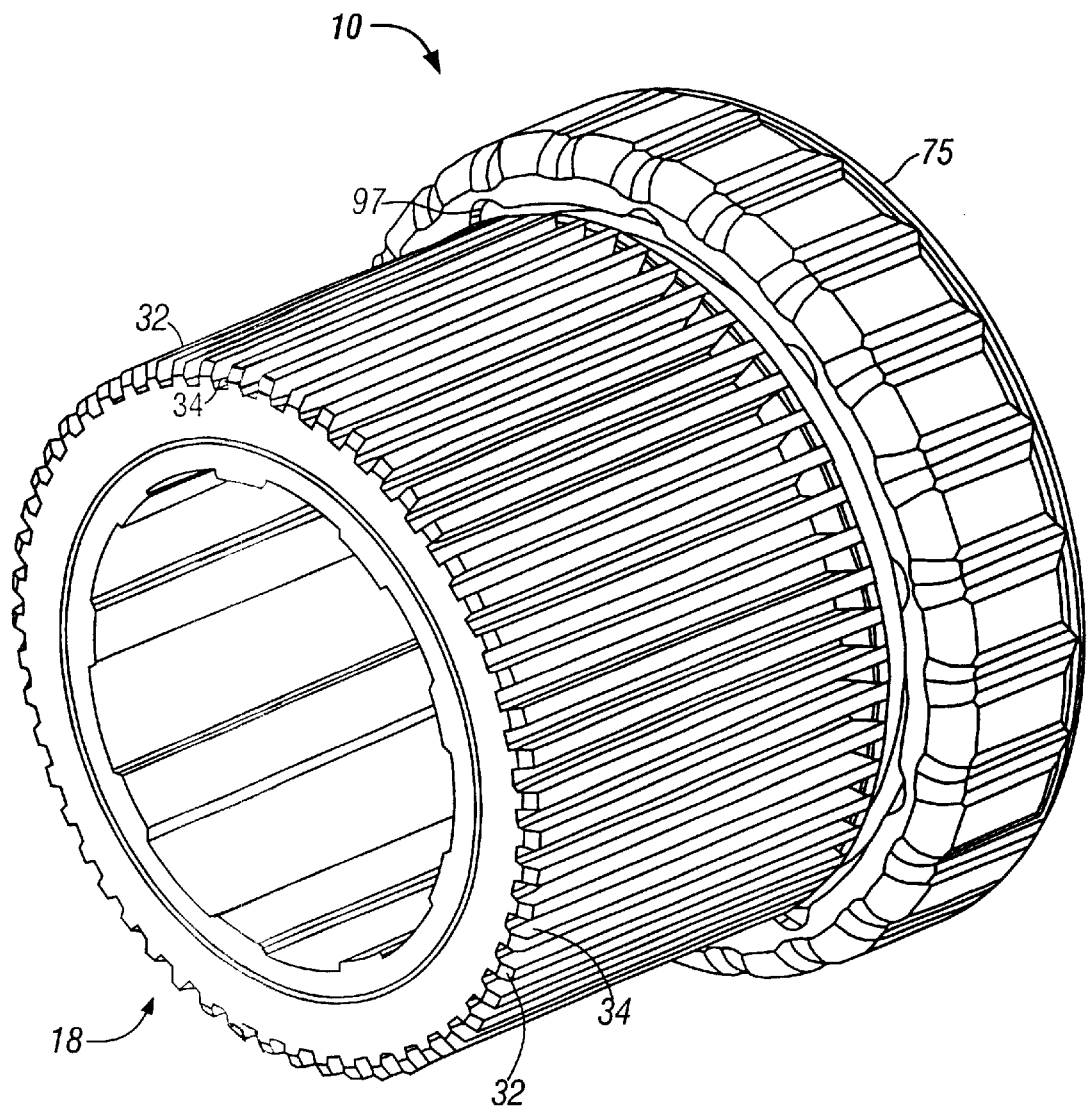
FIG. 1 is a perspective view of one form of the tone ring and the retainer showing these parts in their assembled condition, and taken from the axially inner end of the tone ring.

While the tone ring may be embodied in many applications, including automotive and non-automotive applications such as power take-offs, generators and others, a detailed description of the tone ring or exciter ring assembly and its auxiliary components including the detector or sensor will be given first in an application wherein a vehicle drive axle shaft rotates the tone ring, the sensor is located in a fixed position in the axle tube housing just radially outside or removed from the tone ring surface, and an optional flange on the tone ring holds the ring in a fixed position by reason of contact between the flange and a flange of the retainer, preferably with an optional spacer between the tone ring and the retainer.

Referring now to the drawings in greater detail, FIGS. 1–4 show a tone ring assembly generally designated 10, preferably located axially inside the wheel bearing within an axle tube housing assembly generally designated 12, wherein a sensor 14 is held in fixed position within an opening generally designated 16 in the housing assembly 12.

The tone ring body, generally designated 18, includes an axially extending portion 20, a radial flange 22 defined by axially inner and outer surfaces 24, 26 and a radially outermost, stepped surface generally designated 28. The body generally designated 18 includes a radially outer surface generally designated 30 on the axially extending portion 20, the axially inner portion of which is defined by alternately radially extending lands 32 and grooves 34, preferably extending directly purely axially.

The radial flange 22 has a stepped surface 28, having a major diameter surface 35 and a minor diameter surface 36 therein for the axial passage of oil. The inside of the tone ring body 18 includes a rubber portion generally designated 38, and this portion includes a beveled lead-in area 40. In addition, there are plural axially extending ribs 46, each of which includes a lead-in area 44.

The ribs 46 are spaced apart by axially extending grooves 48. The ribs 46 snugly engage the outer diameter 49 of the axle shaft shown as 50, by engaging a portion 52 thereof which is of intermediate size, being slightly larger in diameter than the axially inner portion 53 of the shaft and smaller size than the portion 54 engaging the inside diameter 56 of the bearing generally designated 58.

The bearing 58 is shown to include roller elements 60, and an outer retainer 64. The actual type of bearing may vary, and, for example, may feature the rollers 60 indirectly engaging the shaft, or being free from a bearing cage or other locator.

Oil may pass axially through the grooves 48 in the tone ring 18 from the differential (not shown) to the bearings 58 and to the seal generally designated 66. Although not a necessary part of the invention, the seal 66 is shown typically to include a casing or stamping 68 and a rubber primary lip 70. The seal is shown with an auxiliary or dirt lip 71 as is typical with vehicle axles, but this is not strictly necessary.

The tone ring body 18 does not move measurably axially once it is finally installed in the appropriate position over a portion 52 of the shaft 50. In addition to being held by the friction of the ribs 46, the body 18 is also held in a final axial position by a tone ring retainer generally designated 75. Preferably, but not necessarily, the retainer generally designated 75 is made from two components, a thicker gauge radially outer indented casing generally designated 76 and a thinner gauge radially inner casing generally designated 78.

The radially inner casing 78 includes an axially extending portion 80 and a radially inwardly extending retaining flange 82, while the outer casing generally designated 75, into which the inner, thinner casing 80 is pressed, includes a radially inwardly extending retainer flange 83, a generally axially extending portion 84 which includes a corrugated exterior surface portion generally designated 88. Thus, the portion of the casing generally designated 88 includes both raised portions 90 which engage the counterbore 92 and depressed portions 94 which permit axial passage of oil. There are also scalloped cut-outs 97 or relieved areas in the radial flange 83 of the retainer 88. Thus, oil flow may be inside the body 18, outside of the retainer 88, or between the tone ring 18 and the retainer 88. The result upon final assembly of the components is a U-shaped retainer in cross-section having flanges 82, 83 which will prevent undesired axial movement of the tone ring body 18 in either direction.

Referring now to another preferred element of the invention, a spacer generally designated 96 is shown to be confined between the radial flange 82 of the inner casing 78 and the axially outer surface 26 of the radial flange 22 of the tone ring 18.

This spacer 96 includes a continuous inner portion 98 and a plurality of teeth 100 separated by spaces 102. Preferably, the teeth 100 include beveled end portions 104 and flat, axially inner and outer surfaces 106, 108 to facilitate engagement of the radial flange 82 of the radially inner casing 78 and the axially outer surface 26 of the tone ring radial flange 22.

The tone ring body 18 may also have a groove 110 or relieved portion adjacent the radial flange 22 to provide extra clearance between the body 18 and the radial flange 83 of the retainer 75.

Assembling the tone ring with its mating parts is a fairly straightforward operation. The axle shaft 50 includes a smaller diameter portion 53 throughout most of its length. As the axle shaft 50 approaches its axially outer end, however, the diameter is very slightly enlarged as at 52, and the axle shaft 50 includes another step lying toward a larger diameter surface 54 terminating before the flange generally designated 57.

The sensor generally designated 14 is positioned properly relative to the lands and grooves on the tone ring body 18 at this time or later. Since it does not interfere with the tone ring, it can be inserted at any time. The retainer 75 is then placed in the counterbore 92 with a light press fit, while the tone ring body is held within the retainer. The tone ring is held such that it does not tilt excessively, and thus is positioned to receive the axle. No other means is required to guide the axle shaft into position within the body 18. Next, the bearing unit 58 is positioned with its outer retainer 64 pressed into its just larger counterbore 95, and finally, the casing 68 of a seal unit 66 is pressed into the largest counterbore 101.

Figure 4:
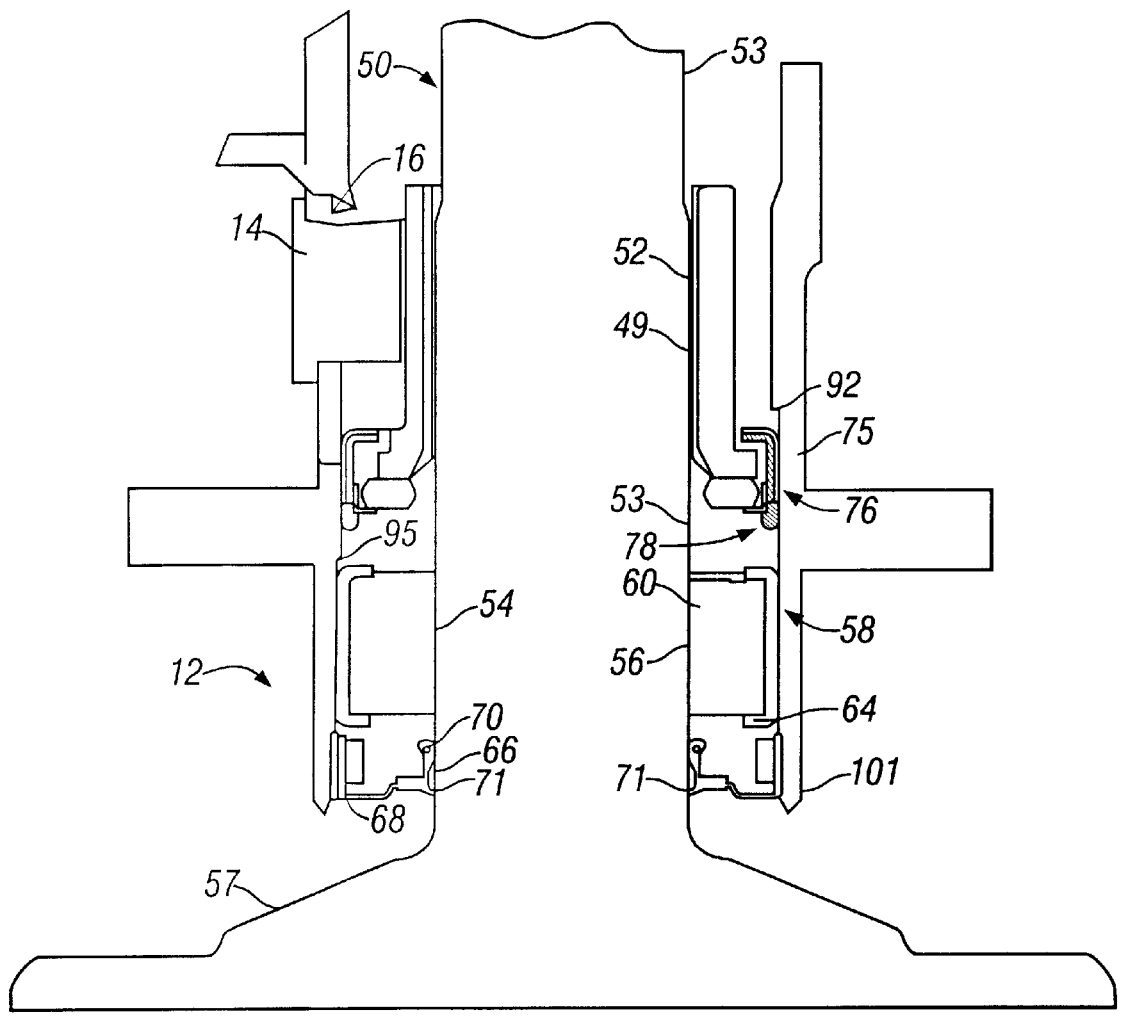
FIG. 4 is a horizontal sectional view of the tone ring assembly, including the retainer, the spacer and the tone ring in their installed positions within the axle housing and over the axle shaft, and showing the seal and bearings in position encircling the shaft.

The axle shaft 50 is then inserted gradually until it engages the tone ring 18 on its inner diameter ribs 46. Then, with the tone ring resisting further inward movement by reason of engagement between the radial flange 83 of the retainer 75 and the tone ring flange surface 24, the axle shaft 50 is pushed gradually axially inwardly (to the right as shown in FIG. 4) until the innermost end of the axle shaft is positioned to receive a C-clip (not shown) or holding the axle shaft in position. Thereafter, the axle shaft is withdrawn axially a few millimeters so the C-clip is properly engaged and seated in the differential. This moves the tone ring slightly to the left as shown in FIG. 4 and insures that the axially outer surfaces 108 of the spacer teeth 100 will engage the retainer flange, if necessary, sliding the tone ring body 18 slightly axially inwardly relative to the axle shaft and insuring that the body is properly positioned against spacer 96 which is positioned against retainer flange 82. Thus, the installation is self-aligning and self-centering, which is very desirable. Once the installation is made, another axle shaft may be reinserted in the application by simply pushing it, usually by hand, into place within the tone ring body. Of course, if the original axle shaft were removed, it could be reinserted inside the tone ring.

The materials from which the tone ring are made are conventional for this application. For example, the tone ring itself may be made from a ferromagnetic powdered metal, which is die-formed then sintered into the desired finished form. Other materials may be used, but powdered metal technology may be preferred by reason of its affording relatively deep, square lands and grooves as well as its cost-effective magnetic properties. Metal embedded in plastic can also be used, including magnetic strips laid out axially, and then covered with an elastomer or a plastic material which is permitted to harden.

The rubber used to form the ribs 46 and the surrounding material is an EPDM or other suitable elastomer such as so-called Nitrile (NBR), HNBR, FKM, AEM, ACM or other elastomer. Plastics or thermoset materials can also be used as outlined above in another suitable form. The ribs 46 and surrounding portions 40, 42 of the elastomer may be coated with a dried PTFE material for lubrication, and the substrate may be made from a thermoplastic or thermoset material. For purposes of lubrication, a wet lubricant such as oil, grease or an ammonium alkyl phosphate may be placed on the ID of the tone ring. Both parts of the retainer are preferably made from mild steel but plastic could also be used.

The spacer is an insulating, lubricous material such as Delrin or acetal material, but it possibly could be replaced by a low friction coating on the retainer or on the tone ring flanges, or both, or eliminated completely.

The retainer is fabricated for convenience in two pieces, an inner, thinner piece and an outer, thicker piece, but it could be made in a single piece. The illustrated form has the corrugations in one part of the retainer, which is then combined with a thinner, flat portion to make the radial flanges. The rubber material used in forming the ribs 46 is of the type that will swell in the presence of oil or grease, including oils with extreme pressure additives therein. Consequently, when the tone ring is installed over the axle, it may be located easily, but after the tone ring has been in place for a time, the oil further swells the rubber and the tone ring is held much more firmly in place.

Figure 5:
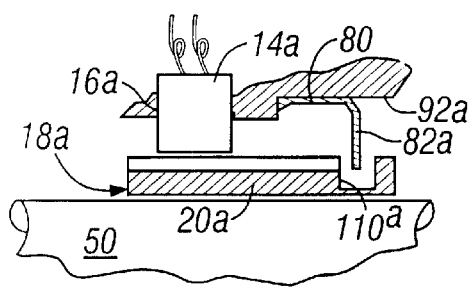
FIG. 5 is a fragmentary view, with portions broken away, showing an alternate embodiment of the invention; and, FIG. 6 is a fragmentary view, with portions broken away, showing an embodiment of the invention wherein the sensor is positioned over a window or opening in the retainer.

As alternate designs, one may also provide several other constructions. In one such construction, which would be the simplest of these, and is illustrated in FIG. 5, the tone ring generally designated 18a could simply not have the radial flange, which now affords the simplest way for the retainer to insure that the tone ring does not excessively move axially on the shaft during installation. Instead, there is a groove 110a in the body 20a of the tone ring 18a, and a flange 82a extending into the groove 110a. In such a construction, the axial extent of the tone ring would be much larger than the axial extent of the retainer in the first embodiment, but the counterbore 92a would have the axial flange 80 pressed into it. The sensor 14a rests in an opening 16a. In this way, a unitized construction would also be provided.

Figure 6:
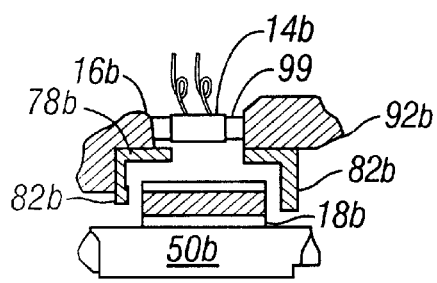

Another alternate construction is shown in FIG. 6. Here, there is no groove or flange, but the retainer 78b is allowed to span the entire axial length of the tone ring with both flanges 82b, 82b thereby confining the body 18b against the axial movement. In such a construction, of course, it would be necessary to provide an opening or window 99 in one portion of the retainer so that the sensor 14b could function properly.

As previously indicated, the spacer may be eliminated, and in its place, a lubricous coating could be placed on the face of the radial flange 26 of the body, or on the inner face of the flange 82, or both. This expedient could be used in the interest of ultimate cost savings, particularly where there would be little or no risk of significant axial movement of the tone ring after installation, that is, during operation. In the further alternative, the spacer could be made of a hard grease block material, thereby being adapted to dissolve after significant contact with the radial flange of the body and the radial flange of the retainer.

It is important that there be at least one axial oil passage in the assembly, and preferably, several passages. The most advantageous way of providing these passages is to space the tone ring body apart from the axle shaft by a series of shallow ribs, and then also provide passages in the spacer, the retainer, and in the tone ring flange which periodically come into registration to allow the passage of oil through the part. Still further, the outside diameter of the retainer is also preferably provided with a corrugated or like outside diameter to permit the passage of oil around the retainer. These are all useful ways to provide lubrication to the bearings with oil traveling from the differential.

The simplest application of the tone ring assembly would be for use in controlling speeds of a single shaft, for example, a generator shaft. However, a more typical use of the tone ring and its associated parts is with two wheel drive vehicles, where the feedback from the sensor is sent to a computer which then determines relative velocities of the two axles. For example, such a use would be in ABS systems (anti-lock braking systems), and differential control systems.

The tone rings are most advantageously used in four wheel drive systems, where the speed of each axle is desired to be governed by a computer having four or more inputs. Thus, the tone rings are useful, not only in various braking systems, but also in traction control systems where front wheel versus rear wheel speeds must be determined instantaneously, and where right versus left wheel speeds may be also measured instantaneously and then corrected, according to the design of the system.

It will thus be seen that the present invention provides an improved tone ring assembly having a number of advantages and characteristics including those expressly pointed out herein, and others which are inherent in the invention. A few embodiments of the product of the invention, having been shown and described, it is anticipated that variations to the described form of apparatus will occur to those skilled in the art and that such modifications and changes may be made without departing from the spirit of the invention or the scope of the appended claims.

We claim:

1. A tone ring assembly for use on a rotatable machine part, said assembly including a rotatable tone ring able to generate a varying voltage output when rotated at varying speeds, with a fixed magnetic sensor assembly disposed in facing relation and closely spaced from said tone ring, said rotatable machine part including an axially inner portion and an axially outer portion running in a surrounding bearing unit, said tone ring comprising an axially extending main body portion with a plurality of areas able to generate a voltage output upon rotation, a retainer having at least one radial flange to prevent substantial axial movement of said tone ring, said tone ring including plural axially extending ribs of reduced diameter on its inner diameter for snugly engaging a shaft, and having axial spaces of enlarged diameter between said ribs, thereby affording passages for oil to pass axially through said tone ring assembly.

2. A tone ring assembly as defined in claim 1, wherein said tone ring able to generate a voltage output by rotation comprises a tone ring body which includes a large plurality of axially extending lands and grooves therein.

3. A tone ring assembly as defined in claim 1, wherein said tone ring able to generate a voltage output by rotation comprises a tone ring body having a large plurality of magnetic strips arranged in an axially extending formation and spaced circumferentially apart from each other.

4. A tone ring assembly as defined in claim 1, wherein said tone ring body includes a radial flange formed on the axially outer end thereof.

5. A tone ring assembly as defined in claim 1, wherein said at least one radial flange on said retainer comprises two radial flanges.

6. A tone ring assembly as defined in claim 5, wherein said retainer is comprised of two pieces, a radially inner retainer portion of generally L-shape and a radially outer retainer portion of generally L-shape, both portions being combined to form a U-shaped assembly having axially inner and outer radial flanges.

7. A tone ring assembly as defined in claim 6, wherein said retainer is a metal retainer made from two separate elements pressed and locked together.

8. A tone ring assembly as defined in claim 7, wherein said radially outer portion of said retainer is made from a thicker gauge of metal than said radially inner portion of said retainer.

9. A tone ring assembly as defined in claim 1, wherein said retainer includes a corrugated outer diameter, whereby oil may pass axially along the outer diameter of said retainer.

10. A tone ring assembly as defined in claim 1, wherein said retainer is made from a thermoplastic or thermoset plastic material.

11. A tone ring assembly as defined in claim 1, wherein said axially extending ribs on the inner diameter of said tone ring assembly have beveled end portions so as to facilitate installation over an associated axle shaft.

12. A tone ring assembly as defined in claim 1, which further includes a spacer, lying in use between one end of said tone ring and one flange of said retainer, said spacer being made from a low friction material which is also resistant to noise making when in at least occasional contact with said tone ring.

13. A tone ring assembly as defined in claim 1, in which said at least one radial flange of said retainer includes an axially inwardly facing flange on said retainer coated with an anti-friction material.

14. A tone ring assembly as defined in claim 12, wherein said tone ring body further includes a radial flange portion adapted to engage said radial retainer flange, said radial flange on said body having areas of different diameters, with relief areas on said radial retainer flange, said spacer having plural separate teeth thereon, said teeth being engage able by the axially outer radial flange of said retainer, thereby allowing the passage of oil through the relief areas and said teeth areas.

15. A tone ring assembly as defined in claim 12, wherein said spacer is made from a plastic material.

16. A tone ring assembly as defined in claim 12, wherein said spacer is made at least in part from a hard grease block.

17. A tone ring assembly as defined in claim 4, which further includes a low friction coating material on the axially outermost portion of said radial flange on said tone ring body.

18. A tone ring assembly as defined in claim 4, wherein said radial flange is an assembled metal flange made from a different material than the remainder of said tone ring body.

19. A tone ring assembly as defined in claim 12, wherein said spacer is discontinuous at its outer diameter to permit oil flow axially therethrough.

20. A tone ring assembly as defined in claim 1, wherein at least said rib portion of said tone ring is an elastomer that is a blend of NBR and EPDM.

21. A tone ring assembly as defined in claim 1, wherein said ribs on said tone ring comprise at last one elastomer selected from the class consisting of NBR, HNBR, EPDM, AEM and ACM.

22. A tone ring assembly as defined in claim 1, wherein said inner diameter of said tone ring includes a coating of dried PTFE.

23. A tone ring assembly as defined in claim 1, wherein said ribs on said inner diameter of said tone ring are made from a thermoplastic or thermoset material.

24. A tone ring assembly as defined in claim 1, wherein said inner diameter of said tone ring includes a wet lubricant coating selected from the class consisting of oil material, grease materials and ammonium alkyl phosphates.

25. A tone ring assembly as defined in claim 4, wherein said radial flange of said retainer includes cut-out portions to permit oil to pass therethrough.

26. A tone ring assembly as defined in claim 4, wherein said body has, on said outer flange thereof, a stepped diameter.

27. A tone ring assembly as defined in claim 4, wherein said tone ring further includes an air gap lying between radially opposed portions of said body and said radial flange for allowance of maximum axle shaft deflections without touching the flanges on said retainer.

28. A tone ring assembly as defined in claim 1, which may have one associated axle shaft removed and either that axle shaft or another axle shaft installed into the original tone ring and retainer assembly.

29. A tone ring assembly as defined in claim 4, wherein said tone ring assembly may be installed over an axle shaft and held in place by interference between said tone ring body and said flanges on said retainer during the entire sequence of installing the axle shaft.

30. A tone ring assembly as defined in claim 5, wherein said flanges on said retainer engage a radial flange on said tone ring body and provide a self-aligning feature and self-centering feature.

31. A tone ring assembly as defined in claim 5, wherein said flanges on said retainer provide for accommodating axial tolerances stacked up in the assembly of the axle shaft.

32. A tone ring assembly as defined in claim 1, wherein said retainer has two radial flanges and spans the axial width of the entire tone ring, said retainer having an opening in at least one part of the axial extent thereof for receiving the sensor.

33. A tone ring as defined in claim 1, wherein said tone ring body is made from a powdered metal material, said body including a radial flange made from a material other than that comprising said tone ring body.

34. A tone ring as defined in claim 33, wherein said tone ring body is made from a powdered metal material and said radial flange is made from a stamped metal material.

35. A tone ring as defined in claim 33, wherein said tone ring body is made from a powdered metal material and said radial flange is made from a plastic material.

36. A tone ring assembly for use on a rotatable machine part, said assembly including a rotatable tone ring able to generate a voltage output by rotation and a magnetic sensor assembly disposed in facing relation and closely spaced from said tone ring, said rotatable machine part including an axially inner portion and an axially outer portion running in a surrounding bearing unit and with oil leakage being resisted by an oil seal, said tone ring comprising an axially extending main body portion with a plurality of lands and grooves, which generate a voltage output upon rotation, and a radially extending flange at one end of said tone ring, a retainer having axially inner and outer radial flanges to prevent substantial axial movement of said tone ring, and a spacer lying between said radially extending flange on said tone ring and said axially outer radial flange of said retainer, said tone ring including plural radially extending ribs on its inner diameter for snugly engaging a shaft, the spaces between said ribs affording passages for allowing oil to pass axially through said tone ring.

37. A tone ring assembly as defined in claim 36, which further includes a groove in said tone ring body lying between said flange and the remainder of said body, said groove receiving one of said axial flanges of said retainer and preventing axial movement of said body.

38. A tone ring assembly as defined in claim 36, wherein said body portion of said tone ring and said retainer are so sized that, upon installation of said retainer in the application counterbore, said body portion is supported by said retainer, and presents an opening in the inside diameter thereof that is able to be aligned without additional aid with an axle shaft which is to be inserted therethrough.

39. A tone ring assembly as defined in claim 36, wherein said flanges on said retainer permit said body to move axially inwardly in one direction during installation to expose an axle clip, and to move in the opposite direction to a position engaging said other axial flange through said spacer.

40. A tone ring assembly for use on a rotatable machine part, said assembly including a rotatable tone ring able to generate a voltage output by rotation and a magnetic sensor assembly disposed in facing relation and closely spaced from said tone ring, said rotatable machine part including an axially inner portion and an axially outer portion running in a surrounding bearing unit and with oil leakage being resisted by an oil seal, said tone ring comprising an axially extending main body portion with a plurality of lands and grooves able to generate a voltage output upon rotation, and a radially extending flange at one end of said tone ring, a retainer having axially inner and outer radial flanges to prevent substantial axial movement of said tone ring, said tone ring including means permitting passage of oil axially along said tone ring as well as means for engaging an axle shaft to locate said tone ring on said axle shaft, said engaging means allowing said axle shaft and said tone ring to become more strongly adherent when said tone ring is exposed to an oily condition.

* * * * *

UNITED STATES PATENT AND TRADEMARK OFFICE
CERTIFICATE OF CORRECTION

| | | |
|---|---|---|
| PATENT NO. | : 6,549,001 B1 | Page 1 of 1 |
| APPLICATION NO. | : 10/012880 | |
| DATED | : April 15, 2003 | |
| INVENTOR(S) | : Dobbs et al. | |

Figure 2:
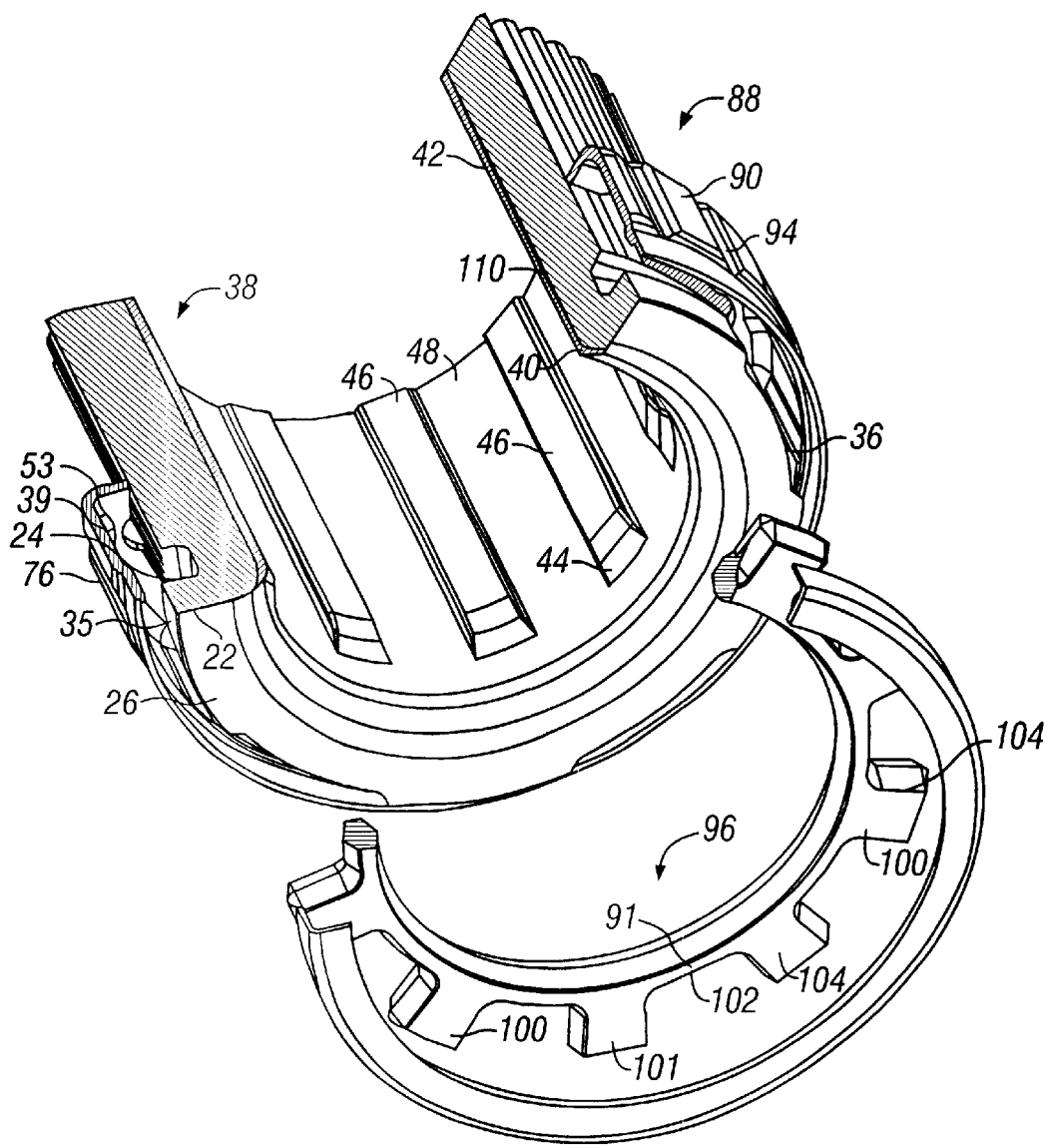
FIG. 2 is an exploded fragmentary perspective view of the tone ring assembly of FIG. 1, taken from the axially outer end so as to illustrate the component parts of the retainer, the preferred form of spacer and the various features of these parts and the tone ring.
Figure 3:
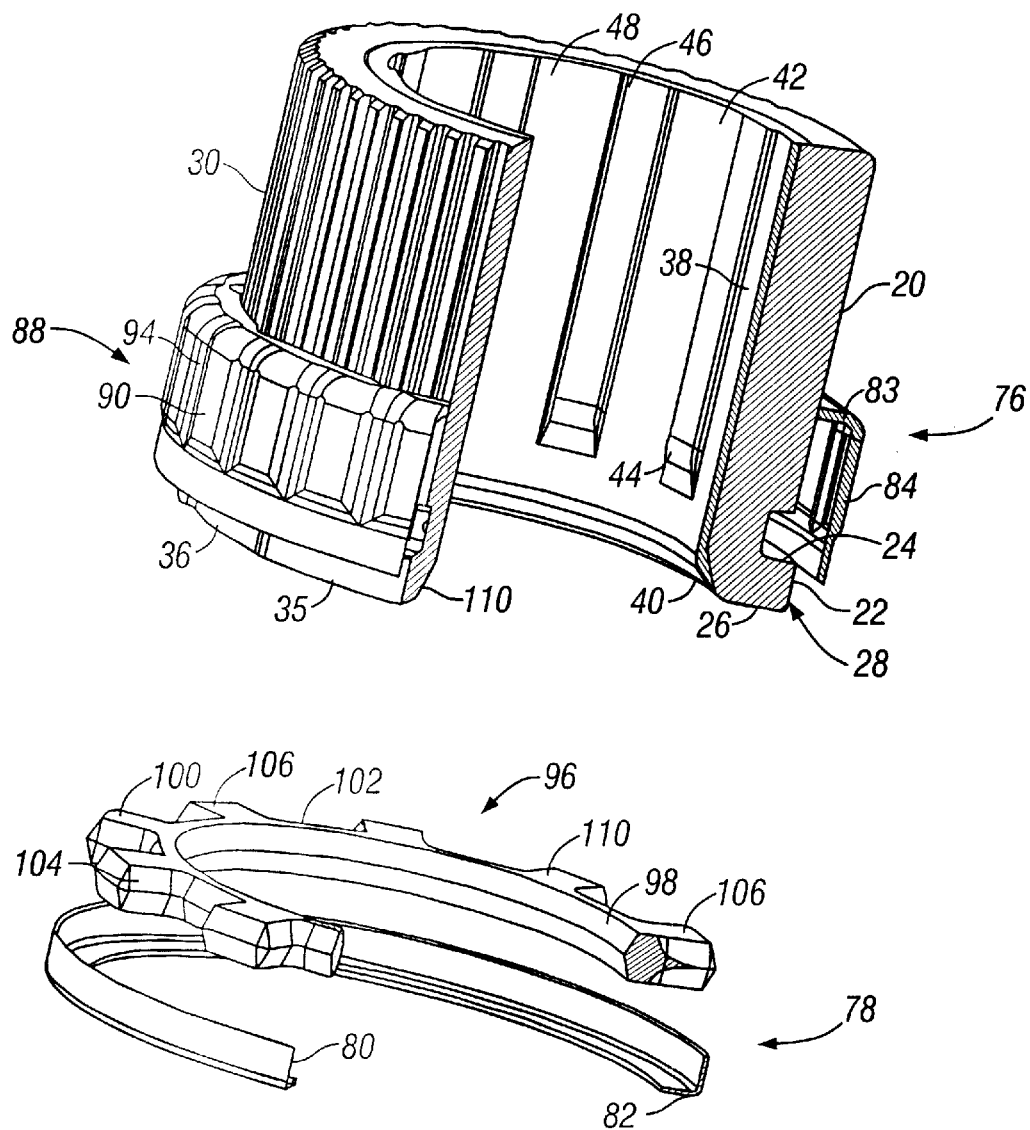
FIG. 3 is an exploded fragmentary perspective view of the tone ring assembly of FIGS. 1 and 2, and showing the retainer in two parts, and the spacer as well as the tone ring from the axially inner end thereof.

It is certified that error appears in the above-identified patent and that said Letters Patent is hereby corrected as shown below:

In the Drawings:
In Fig. 2, on the lower part please delete the number "101" and the number "104" and substitute therefore the number --108-- in both instances.

In Col. 2, line 56, between the words "retainer or" and "ring flange" please delete the word "toner" and substitute therefore the word --tone--.
In Col. 5, line 58, between the words "axially inward" and "as shown" please delete the words "to the right" and substitute therefore the word --up--.
In Col. 7, line 22, between the words "which periodically" and "into" please delete the word "come" and substitute therefore the word --comes--.

Signed and Sealed this

Sixth Day of February, 2007

JON W. DUDAS
*Director of the United States Patent and Trademark Office*